Figure 4:
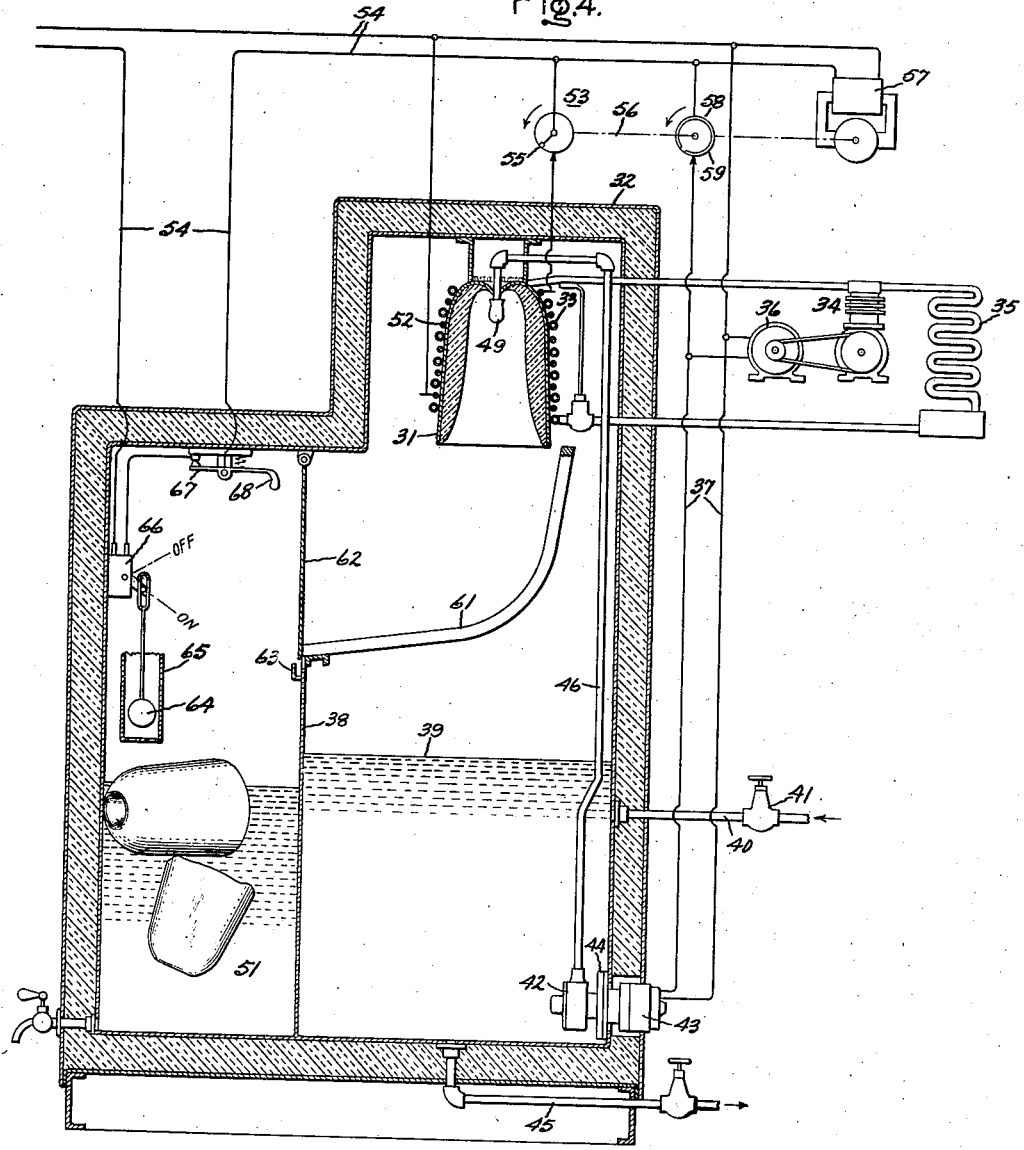

Feb. 1, 1944.    W. R. WHITNEY    2,340,721
APPARATUS AND METHOD FOR PURIFYING WATER
Filed Oct. 5, 1942    2 Sheets-Sheet 1
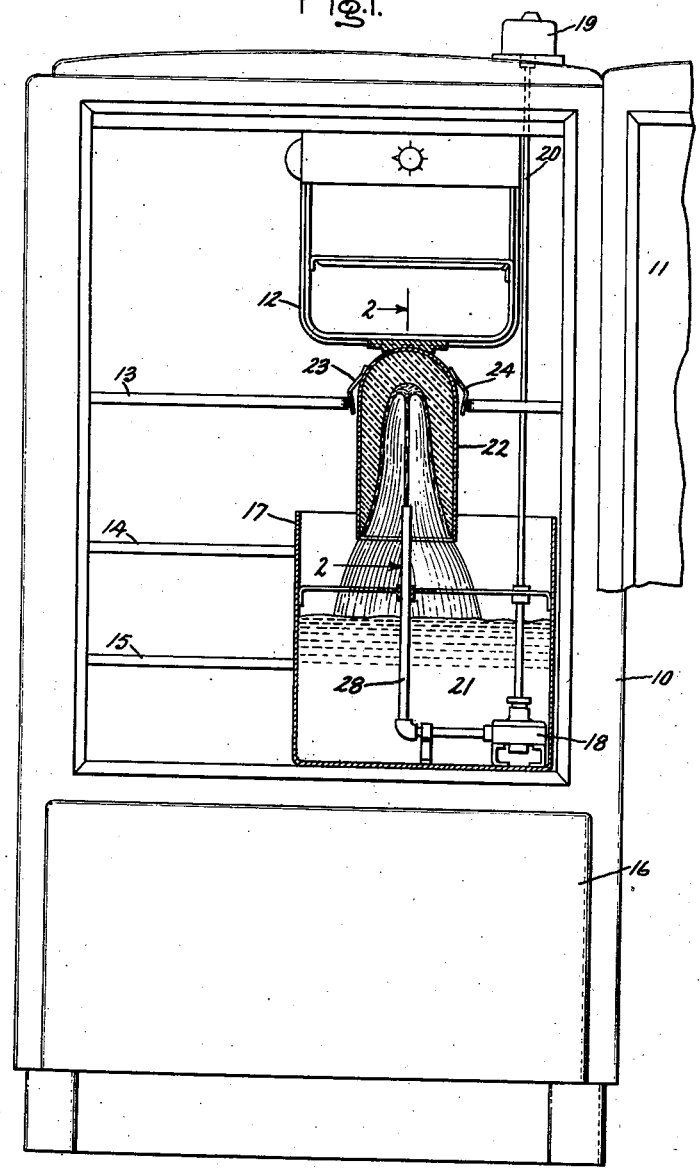
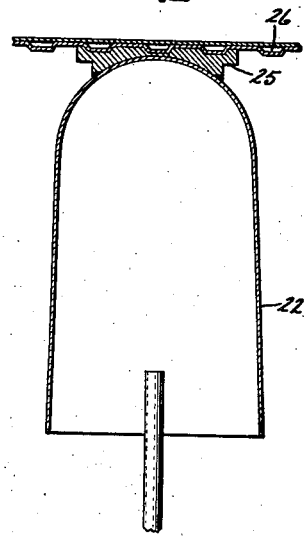
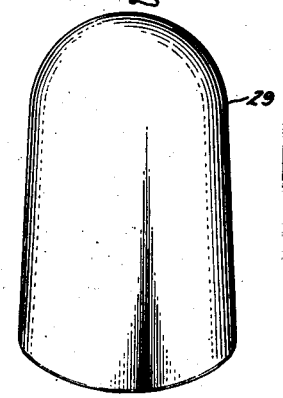
Inventor:
Willis R. Whitney,
by Harry E. Dunham
His Attorney.

Feb. 1, 1944.    W. R. WHITNEY    2,340,721
APPARATUS AND METHOD FOR PURIFYING WATER
Filed Oct. 5, 1942    2 Sheets-Sheet 2

Inventor:
Willis R Whitney,
by Harry E. Dunham
His Attorney.

Patented Feb. 1, 1944

2,340,721

UNITED STATES PATENT OFFICE 2,340,721

APPARATUS AND METHOD FOR PURIFYING WATER

Willis R. Whitney, Schenectady, N. Y., assignor to General Electric Company, a corporation of New York Application October 5, 1942, Serial No. 460,767

7 Claims. (Cl. 62—124)

The present invention comprises an improved method of and apparatus for preparing ice or water of controllable degree of purity from a liquid containing dissolved or suspended matter, as for example sea water, or for abstracting water from liquids such as milk or fruit juices, which are to be concentrated, without heating them.

Theoretically, the freezing point of an aqueous solution such as brine is that temperature at which the solution and pure ice are in equilibrium. But, owing to the tendency of water to freeze in long, needle-like (arborescent) crystals, the ice in practice encloses much of the unfrozen solution. For this reason it has been found impracticable heretofore to obtain any appreciable quantity of pure ice from such solutions as sea water or other strong solutions. The fact that impurities are mechanically trapped during the formation of the ice can be readily demonstrated visually by dissolving a colored material in water from which ice is derived. The presence of color in the ice unmistakably indicates the presence of impurities.

In accordance with the method constituting one aspect of my invention, pure ice is derived from impure water by causing a jet or fountain of such water, at a sufficiently low temperature, to be projected forcibly against a surface which is cold enough to cause the progressive accumulation of ice thereon to occur, the temperature depending on the character and concentration of the solution but in any event being below 0° C. The stream of cold impure water is caused to flow over all the surface of the growing ice at a velocity so high as to wash away the impurities as fast as they are rejected during the freezing process. During this contact with the freezing surface the impure water is maintained close to its freezing point which falls continually as the concentration of dissolved matter therein rises.

In apparatus constituting my invention, there is provided the combination of means for providing the continuously active freezing surface, a reservoir for holding the impure water, and pumping means for continuously projecting a dense jet of said water against said freezing surface from which the unfrozen portion returns to said reservoir. These, and other features of my invention, will be set forth in the appended claims and described in greater detail in connection with the accompanying drawings.

Figure 5:
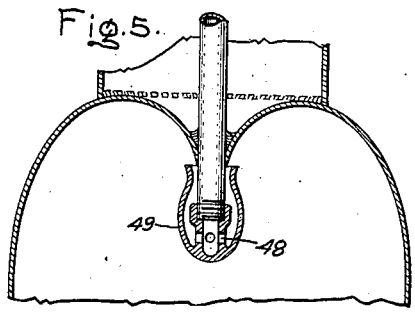

Fig. 1 is an elevation, partly in section, of a refrigerator usable also for storage of food and containing means for carrying out my invention; Fig. 2 is a vertical section of a freezing dome; Fig. 3 is a perspective view of a mass of ice taken from such dome; Fig. 4 is a vertical section of a modification which is arranged to discharge ice automatically into a melting chamber; and Fig. 5 is a sectional view of a projector head whereby impure water may be delivered upward to the freezing surface.

The apparatus illustrated in Fig. 1 comprises a freezing cabinet 10, the door 11 of which is shown as open and as broken away except for a narow marginal strip. There is provided as usual an evaporator 12, and a number of shelves 13, 14, 15 for supporting articles to be refrigerated. The compressor and its appurtenances are not shown and may be assumed to be hidden back of the compartment containing the evaporator, or else to be contained in the space below the freezing cabinet which is closed by the place 16.

Within the cabinet 10 is a tank 17 in which is located a pump 18 which is connected to the motor 19 (located at the top) by a drive shaft 20. The tank contains a quantity of salt water 21, or other liquid, from which water of potable or higher purity is to be abstracted by freezing.

The convex top surface of the dome-shaped freezing unit is held in any suitable manner, as by the spring clips 23, 24, in good thermal contact with a complementary concave surface of the evaporator. It is advisable to provide a film of water between the contiguous surfaces of the parts 22 and 25 which, by freezing quickly, cements them firmly together. One form of construction is shown in section in Fig. 2. The contact evaporator wall 25 is provided with ducts 26 in which the compressed cooling medium is permitted to expand, thereby cooling the freezing unit 22 to the freezing temperature of the salt water or the like.

The pump 18 forces salt water, or other impure liquid, from the tank 17 through a tube 28 into contact with the cooled surface in the upper part of the freezing chamber 22. The stream of liquid issuing from the orifice of the tube 28 upon striking the upper part of othe device 22 spreads out and flows over the vertical freezing surface. As ice forms, its surface is continuously washed or "buffed" by the descending water, thereby preventing the inclusion of salt or other impurities by the ice and removing any adsorbed product as ice is slowly built up. A circular, dome-shaped freezing surface is favorable for obtaining uniform and uninterrupted flow of the solution over the ice which is being formed. The vertical sides of such a freezing surface are rounded. An interruption or deflection of flow at any point of the surface would produce a current eddy in the descending solution, resulting in the local collection and freezing-in of impurities at that point.

As shown, most of the salt water or other liquid returns continuously to the tank 17. By its contact with the freezing surface of the dome or with the ice forming therein, the impure liquid in the tank 17 is maintained at approximately its current freezing point. Numerical values for the velocity of the projected stream of water or the like can only be illustrative as the required velocity varies with the various conditions, such as character of the impure liquid, size of the apparatus, desired purity of the ice, and desired rate of freezing. However, for illustrative purposes the following example is given. In an apparatus containing four separate domes, each provided with its separate fountain from a common pump, a favorable jet diameter is one half inch and the rate of flow through one jet may be approximately six quarts per minute.

When a desired amount of ice has formed, the dome-shaped freezing unit 22 is removed. When it is warmed, a body of ice 29 (Fig. 3) drops out. The purity of the ice is controllable by the rate of freezing and the velocity of the projected stream. The ice thus produced may be melted within the refrigerator cabinet to utilize it as a cooling agent. Of course, it may be allowed to melt externally if desired. The water derived from the melting ice can be of potable purity, or of the high degree of purity of distilled water, depending on the ice-forming rate.

The apparatus shown in Fig. 4 differs in various details from the apparatus shown in Fig. 1. The freezing unit 31 is mounted fixedly at the top of a heat-insulated housing 32. It is provided externally with a refrigerating coil 33 which is connected to a compressor 34. The latter is provided with a cooling coil 35 as usual. The motor 36 driving the compressor is connected electrically to receive energy from the mains 37. Below the freezing unit 31 is a tank 38 for holding salt water 39, or other liquid, from which pure ice is to be derived. This liquid may be introduced through a conduit 40 which is provided with a valve 41. In this liquid is a pump 42 which is connected to an external motor 43 by a shaft passing through a plate 44 of rubber or other material which will make a tight seal. The body of water 39 may be drawn off through a valved conduit 45.

The salt water or other liquid is pumped through the conduit 46 and is discharged by the nozzle 49 upwardly against the dome 31. As shown in Fig. 5, the flow of liquid through the nozzle orifices 48 is reversed by the cup-shaped deflector 49 so as to strike the upper part of the dome 31. The liquid then flows downwardly over the surface of the ice, washing away the rejected impurities before they can be trapped.

In this apparatus the ice may be automatically released from time to time from the freezing dome and allowed to slide into a storage chamber 51 where it may melt. The dome 31 is provided with an electric heater 52 which is connected in series with a contact-making device 53 to an electric circuit 54. The device 53 is provided with a conductive segment 55 which is mounted on a shaft 56, the latter being connected by gearing (not shown) to the rotor of a motor 57 and is slowly rotated by the revolution of this motor.

The motor 57 may be of any suitable type, such as a synchronous single phase motor. Also mechanically connected to the rotor of this motor is a rotating contact maker 58. This contact maker has a conductive segment 59 which is complementary to the segment 55 so as to energize the circuit 37 when the heater 52 is not energized. During the interval when the circuit 37 is energized, ice is frozen in the chamber 31. When the circuit 37 is deenergized, the heater is energized through the segment 55. Freezing then is discontinued and the warming of the dome by the heater releases the ice by melting of the layer adjacent the dome.

The ice drops down on bars 61 and slides into the melting chamber 51, the swinging door 62 being pushed aside by the ice. Any slight amount of salt water running down the bars 61 is caught by the trough 63. If water accumulates in the chamber 51 and rises to a sufficient height to raise the float 64 which is located in a perforated housing 65, then the relay switch 66 is moved from the "on" to the "off" position, thereby deenergizing the circuit 54 and causing the operation of the device to be discontinued. The apparatus also may be deenergized by the mechanically operated switch 67 if the door 62 is moved by excess ice to a position causing it to strike the lever 68 which has a cam-shaped tip positioned to engage with the door 62 when pushed to the left as illustrated. If desired, the apparatus of Fig. 4 may be manually controlled.

Although my invention has been described with particular reference to aqueous solutions, it is to be undertsood that it is capable of wider application, that is, to the separation by freezing of a component of non-aqueous solutions.

What I claim as new and desire to secure by Letters Patent of the United States is:

1. The method of producing substantially a pure solvent component from a solution which consists in projecting a jet of said solution while at a temperature approximating the freezing point thereof into contact with a surface which is maintained at a temperature sufficiently low to cause a portion of a liquid component to freeze thereon, so distributing a stream of excess solution over the surface of frozen component to cause it to be continually washed, and maintaining the velocity of said stream with respect to the rate of freezing sufficiently high to prevent occlusion of impurities in said frozen component.

2. The method of producing substantially pure ice from a saline solution which consists in cooling a body of said solution to a temperature closely approximating the freezing point thereof, projecting a jet of said cold solution into contact with a freezing surface, maintaining said surface below the freezing point of said solution to thereby cause ice to form thereon, distributing a stream of excess solution over all of said freezing surface to wash away rejected solution from the surface of the ice during freezing, and maintaining the rate of flow of said stream high enough to prevent trapping impurities in the ice as it is formed.

3. The method of deriving potable water from water containing an amount of impurity which is undesirably high for potability, which consists in directing a stream of the impure water at substantially freezing temperature thereof against a substantially vertical circularly dome-shaped surface which is maintained at a temperature below the freezing point, thereby causing ice to form at said surface and controlling the purity of the ice during formation by the velocity of flow over said surface of surplus water from said stream whereby inclusion of suspended or dissolved impurities is obviated.

4. The method of treating water containing dissolved or suspended impurities, which consists in projecting a body of impure water against a cold surface, maintaining such surface at a temperature below the freezing point of said impure water, continuously collecting and reprojecting said water until said body of water has been cooled to the freezing point thereof, whereby ice forms on said surface, so controlling distribution and rate of flow of said impure water over the ice forming at said cooled surface that impurities rejected during freezing are washed away from the surface of the ice.

5. An apparatus for separating from an aqueous solution a mass of ice which is substantially free from said material which comprises the combination of a freezing means having a smooth dome-shaped surface with dependent vertical sides to cause a liquid which has been forced against the upper part of said surface to drain uniformly over said surface, means for projecting a jet of said solution against the dome-shaped part of said surface and means for maintaining said surface at an ice-forming temperature.

6. An apparatus for abstracting potable water from brine, comprising the combination of a cylindrical freezing chamber which is open at the bottom and having a closed, dome-shaped upper surface which is shaped when liquid is drained therefrom by gravity to result in energetic flow uniformly over ice forming therein, means for projecting a jet of brine against the upper part of said chamber, and means for cooling the surface washed by said brine to a temperature sufficiently low to cause the formation of ice thereon, and means for collecting and reprojecting unfrozen brine against the upper dome-shaped part of said freezing chamber.

7. An apparatus for separating substantially pure ice from an aqueous solution comprising the combination of a freezing chamber having a closed, dome-shaped top and vertical sides favorable to the substantially even distribution of liquid draining therefrom, means for projecting a stream of solution against an upper part of its interior surface, means automatically operative to release ice formed on said surface at predetermined intervals, and means for collecting the released ice.

WILLIS R. WHITNEY.